(12) United States Patent
Bivolarsky et al.

(10) Patent No.: US 11,536,696 B2
(45) Date of Patent: Dec. 27, 2022

(54) IN-WALL MULTI-BOUNCE MATERIAL PROPERTY DETECTION AND ACOUSTIC SIGNAL AMPLIFICATION

(71) Applicant: PERCEPTIVE SENSOR TECHNOLOGIES, INC., Tucson, AZ (US)

(72) Inventors: Lazar Bivolarsky, Cupertino, CA (US); Joel D. Burcham, Huntsville, AL (US); James M. Heim, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/542,872

(22) Filed: Dec. 6, 2021

(65) Prior Publication Data

US 2022/0178881 A1 Jun. 9, 2022

Related U.S. Application Data

(60) Provisional application No. 63/122,344, filed on Dec. 7, 2020, provisional application No. 63/121,763, filed on Dec. 4, 2020.

(51) Int. Cl.
*G01N 29/44* (2006.01)
*G01N 29/04* (2006.01)

(52) U.S. Cl.
CPC ........... *G01N 29/043* (2013.01); *G01N 29/44* (2013.01); *G01N 2291/2634* (2013.01)

(58) Field of Classification Search
CPC .................. G01N 29/043; G01N 29/44; G01N 2291/2634

(Continued)

(56) References Cited

U.S. PATENT DOCUMENTS

| 2,449,054 A | 9/1948 | Chantlin ....................... 177/311 |
| 3,019,650 A | 2/1962 | Swick ............................. 73/290 |

(Continued)

FOREIGN PATENT DOCUMENTS

| CN | 105548370 | 5/2016 | ............. G01N 29/24 |
| DE | 10 2010 029 254 | 12/2011 | ............... F01N 3/10 |

(Continued)

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016);14 pgs.

(Continued)

*Primary Examiner* — Jacques M Saint Surin
(74) *Attorney, Agent, or Firm* — Hayes Soloway P.C.

(57) ABSTRACT

An apparatus, system, and related methods for multi-bounce material property detection and signal amplification are provided. The apparatus has a first acoustic transducer positioned on an exterior sidewall of a pipe or container carrying or holding a quantity of fluid therein. An acoustic signal is transmitted by the first acoustic transducer into the sidewall of the pipe from an exterior surface thereof. With material detection, at least a portion of the acoustic signal reflects off an interior surface of the sidewall of the pipe. The reflected acoustic signal is received at the second acoustic transducer on the exterior sidewall of the pipe. The reflected acoustic signal provides an indication of a material property of the pipe or a material within the pipe. With signal amplification, the second acoustic transducer transmits a phase synchronized second acoustic signal to the first acoustic signal, where the second acoustic signal amplifies the first acoustic signal.

20 Claims, 9 Drawing Sheets

(58) Field of Classification Search
USPC .......................................................... 73/602
See application file for complete search history.

(56) References Cited

U.S. PATENT DOCUMENTS

| | | | | |
|---|---|---|---|---|
| 3,703,829 | A | 11/1972 | Dougherty | 73/290 |
| 3,837,218 | A | 9/1974 | Flambard et al. | G01N 29/00 |
| 3,971,962 | A | 7/1976 | Green | H01L 41/08 |
| 4,065,958 | A | 1/1978 | Krylova et al. | G01N 29/02 |
| 4,118,983 | A | 10/1978 | Braznikov | G01F 23/28 |
| 4,121,468 | A | 10/1978 | Glover et al. | G01N 29/04 |
| 4,182,177 | A | 1/1980 | Prough | 73/290 |
| 4,280,126 | A | 7/1981 | White | 340/621 |
| 4,320,659 | A | 3/1982 | Lynnworth et al. | G01N 29/02 |
| 4,501,146 | A | 2/1985 | Greenhalgh | G01F 23/28 |
| 4,580,448 | A | 4/1986 | Skrgatic | G01F 23/28 |
| 4,596,266 | A | 6/1986 | Kinghom et al. | B65D 88/38 |
| 4,676,098 | A | 6/1987 | Erlenkämper et al. | 73/290 |
| 4,852,416 | A | 8/1989 | Boone et al. | H04R 1/02 |
| 4,934,191 | A | 6/1990 | Kroening et al. | 73/592 |
| 4,954,997 | A | 9/1990 | Dieulesaint et al. | G08B 21/00 |
| 4,977,780 | A | 12/1990 | Machida et al. | G01N 29/04 |
| 5,015,995 | A | 5/1991 | Holroyd | 340/621 |
| 5,038,611 | A | 8/1991 | Weldon et al. | 73/290 |
| 5,148,700 | A | 9/1992 | King | G01N 15/00 |
| 5,195,058 | A | 3/1993 | Simon | G01S 15/02 |
| 5,295,120 | A | 3/1994 | McShane | 367/188 |
| 5,325,727 | A | 7/1994 | Miller et al. | |
| 5,415,033 | A | 5/1995 | Maresca, Jr. et al. | 73/40.5 |
| 5,438,868 | A | 8/1995 | Holden et al. | 73/290 |
| 5,460,046 | A * | 10/1995 | Maltby | G01N 29/09 73/628 |
| 5,469,749 | A | 11/1995 | Shimada et al. | G01F 1/38 |
| 5,604,314 | A | 2/1997 | Grahn | G01L 5/16 |
| 5,770,806 | A | 6/1998 | Hiismaki | G01F 1/662 |
| 5,821,427 | A | 10/1998 | Byrd | G01F 1/66 |
| 6,035,903 | A | 3/2000 | Few et al. | B65B 1/04 |
| 6,151,956 | A | 11/2000 | Takahashi et al. | G01N 3/56 |
| 6,157,894 | A | 12/2000 | Hess et al. | 702/54 |
| 6,192,751 | B1 | 2/2001 | Stein et al. | G08B 21/00 |
| 6,330,831 | B1 | 12/2001 | Lynnworth et al. | 73/861.28 |
| 6,368,281 | B1 | 4/2002 | Solomon et al. | A61B 8/14 |
| 6,443,006 | B1 | 9/2002 | Degrave | G02F 23/00 |
| 6,470,744 | B1 | 10/2002 | Usui et al. | 73/290 |
| 6,481,287 | B1 | 11/2002 | Ashworth et al. | G01K 11/24 |
| 6,513,385 | B1 | 2/2003 | Han | G01N 29/00 |
| 6,575,043 | B1 | 6/2003 | Huang et al. | G01F 1/66 |
| 6,578,424 | B1 | 6/2003 | Ziola et al. | G01N 29/00 |
| 6,631,639 | B1 | 10/2003 | Dam et al. | 73/290 |
| 6,672,163 | B2 * | 1/2004 | Han | E21B 49/08 73/597 |
| 6,925,868 | B2 | 8/2005 | Young et al. | 73/290 |
| 6,938,488 | B2 | 9/2005 | Diaz et al. | 73/597 |
| 7,085,391 | B1 | 8/2006 | Yamaya | G10H 1/00 |
| 7,114,375 | B2 | 10/2006 | Panetta et al. | 73/61.75 |
| 7,246,522 | B1 | 7/2007 | Diaz et al. | 73/597 |
| 7,299,136 | B2 | 11/2007 | DiFoggio et al. | 702/22 |
| 7,330,797 | B2 * | 2/2008 | Bailey | G01F 1/704 702/50 |
| 7,363,174 | B2 | 4/2008 | Kishiro et al. | G01F 25/10 |
| 7,624,650 | B2 * | 12/2009 | Gysling | G01F 1/662 73/861.27 |
| 7,624,651 | B2 * | 12/2009 | Fernald | G01F 1/712 73/861.27 |
| 7,656,747 | B2 * | 2/2010 | Mandal | G01N 29/4427 367/32 |
| 7,694,570 | B1 | 4/2010 | Dam et al. | 73/644 |
| 7,962,293 | B2 * | 6/2011 | Gysling | G01F 1/704 702/45 |
| 7,966,882 | B2 | 6/2011 | Greenwood | 73/597 |
| 8,683,882 | B2 | 4/2014 | Jackson | G01N 9/24 |
| 8,820,182 | B2 | 9/2014 | Nikolay Nikolov et al. | H04Q 9/00 |
| 8,850,882 | B2 | 10/2014 | Qu et al. | G01F 23/296 |
| 8,915,145 | B1 | 12/2014 | Van Orsdol | G01F 1/74 |
| 9,057,677 | B2 | 6/2015 | Field | G01N 29/032 |
| 9,557,208 | B2 | 1/2017 | Kuroda et al. | G01F 23/28 |
| 9,891,085 | B2 | 2/2018 | Muhammad et al. | G01F 1/88 |
| 10,122,051 | B2 | 11/2018 | Kuhne et al. | H01M 10/484 |
| 10,458,871 | B2 | 10/2019 | Norli | G01L 11/04 |
| 10,794,871 | B1 | 10/2020 | Blackshire et al. | G01N 29/265 |
| 11,020,793 | B2 | 6/2021 | De Monte et al. | B22D 2/006 |
| 2002/0170753 | A1 | 11/2002 | Clare | G01G 19/22 |
| 2004/0079150 | A1 | 4/2004 | Breed et al. | 73/291 |
| 2004/0173021 | A1 | 9/2004 | Lizon et al. | 73/290 |
| 2004/0226615 | A1 | 11/2004 | Morikawa et al. | G05D 7/06 |
| 2005/0055136 | A1 | 3/2005 | Hofmann et al. | 700/273 |
| 2005/0128873 | A1 | 6/2005 | LaBry | G01V 1/40 |
| 2005/0178198 | A1 | 8/2005 | Freger et al. | 73/290 |
| 2005/0247070 | A1 | 11/2005 | Arshansky et al. | 62/77 |
| 2006/0196224 | A1 | 9/2006 | Esslinger | 62/509 |
| 2007/0068253 | A1 | 3/2007 | Carodiskey | A61B 6/00 |
| 2007/0157737 | A1 | 7/2007 | Gysling et al. | G01F 1/667 |
| 2007/0205907 | A1 | 9/2007 | Schenk, Jr. | G08B 21/00 |
| 2008/0092623 | A1 | 4/2008 | Lynch et al. | G01N 29/02 |
| 2009/0143681 | A1 | 6/2009 | Jurvelin et al. | A61B 8/00 |
| 2010/0111133 | A1 | 5/2010 | Yuhas et al. | G01K 17/00 |
| 2010/0199779 | A1 | 8/2010 | Liu et al. | G01F 1/663 |
| 2010/0242593 | A1 | 9/2010 | Lagergren et al. | G01F 23/296 |
| 2011/0029262 | A1 | 2/2011 | Barkhouse | 702/55 |
| 2011/0072904 | A1 | 3/2011 | Lam et al. | G01N 29/04 |
| 2011/0120218 | A1 | 5/2011 | Aldridge | 73/290 |
| 2011/0239769 | A1 | 10/2011 | Schmitt et al. | G01N 29/02 |
| 2011/0271769 | A1 | 11/2011 | Kippersund et al. | G01F 1/66 |
| 2011/0284288 | A1 | 11/2011 | Sawyer et al. | E21B 49/005 |
| 2012/0024067 | A1 | 2/2012 | Oberdoerfer et al. | G01N 29/00 |
| 2012/0055239 | A1 | 3/2012 | Sinha | G01N 29/00 |
| 2012/0259560 | A1 | 10/2012 | Woltring et al. | 702/55 |
| 2012/0262472 | A1 | 10/2012 | Garr et al. | G06T 11/206 |
| 2012/0281096 | A1 | 11/2012 | Gellaboina et al. | G01S 15/89 |
| 2013/0002443 | A1 | 1/2013 | Breed et al. | G08B 21/00 |
| 2013/0068027 | A1 | 3/2013 | Sullivan et al. | G01N 29/04 |
| 2013/0080081 | A1 | 3/2013 | Dugger et al. | G01F 1/663 |
| 2013/0090575 | A1 | 4/2013 | Rupp et al. | A61N 7/00 |
| 2013/0120155 | A1 | 5/2013 | Hagg | G08C 19/16 |
| 2013/0128035 | A1 | 5/2013 | Johns et al. | 348/135 |
| 2013/0213714 | A1* | 8/2013 | Fulda | G01V 3/30 175/50 |
| 2014/0020478 | A1 | 1/2014 | Ao et al. | G01F 1/66 |
| 2014/0027455 | A1 | 1/2014 | Castellano et al. | B65D 88/34 |
| 2014/0076415 | A1 | 3/2014 | Dunki-Jacobs et al. | E03C 1/02 |
| 2014/0107435 | A1 | 4/2014 | Sharf et al. | A61B 8/00 |
| 2014/0223992 | A1 | 8/2014 | Harper et al. | G01F 25/0084 |
| 2014/0301902 | A1 | 10/2014 | Fernald et al. | B01J 19/10 |
| 2014/0375169 | A1 | 12/2014 | Na et al. | H01L 41/08 |
| 2015/0075278 | A1 | 3/2015 | Dockendorff et al. | G01F 23/296 |
| 2015/0212045 | A1 | 7/2015 | Raykhman et al. | G01F 1/74 |
| 2015/0247751 | A1 | 9/2015 | Kutlik et al. | G01F 23/2962 |
| 2015/0260003 | A1 | 9/2015 | McHugh et al. | E21B 33/076 |
| 2015/0276463 | A1 | 10/2015 | Milne et al. | G01F 23/296 |
| 2015/0369647 | A1 | 12/2015 | Kumar et al. | G01F 23/284 |
| 2016/0025545 | A1 | 1/2016 | Saltzgiver et al. | G01F 23/263 |
| 2016/0041024 | A1 | 2/2016 | Reimer et al. | G01F 23/296 |
| 2016/0108730 | A1 | 4/2016 | Fanini et al. | E21B 49/08 |
| 2016/0146653 | A1 | 5/2016 | Skelding | E21B 21/01 |
| 2016/0169839 | A1 | 6/2016 | Gottlieb et al. | G01N 29/22 |
| 2016/0216141 | A1 | 7/2016 | Leaders et al. | G01F 1/66 |
| 2016/0320226 | A1 | 11/2016 | Schaefer et al. | G01F 23/296 |
| 2017/0002954 | A1 | 1/2017 | Brown et al. | F16K 37/0058 |
| 2017/0010144 | A1 | 1/2017 | Lenner et al. | G01F 23/296 |
| 2017/0010145 | A1 | 1/2017 | Lenner et al. | G01F 23/2962 |
| 2017/0010146 | A1 | 1/2017 | Kassubek et al. | G01F 23/296 |
| 2017/0059389 | A1 | 3/2017 | Moore et al. | G01F 23/2968 |
| 2017/0082650 | A1 | 3/2017 | Hies et al. | G01F 25/0007 |
| 2017/0087526 | A1 | 3/2017 | Luharuka | B01F 15/00 |
| 2017/0102095 | A1 | 4/2017 | Kunita et al. | F16K 37/0091 |
| 2017/0097322 | A1 | 6/2017 | Giese et al. | G01N 29/07 |
| 2017/0199295 | A1 | 7/2017 | Mandal | G01V 1/50 |
| 2017/0202595 | A1 | 7/2017 | Shelton, IV | A61B 18/00 |
| 2017/0239741 | A1 | 8/2017 | Furuta | B23H 1/10 |
| 2017/0268915 | A1 | 9/2017 | Gestner et al. | G01F 1/66 |
| 2017/0309989 | A1 | 10/2017 | Waelde et al. | H01Q 1/225 |
| 2018/0035603 | A1 | 2/2018 | Kremmer et al. | A01C 7/20 |

(56) References Cited

U.S. PATENT DOCUMENTS

| | | | |
|---|---|---|---|
| 2018/0044159 A1 | 2/2018 | Crouse et al. | B67D 1/0406 |
| 2018/0080809 A1 | 3/2018 | Tokarev et al. | G01F 23/2965 |
| 2018/0149505 A1 | 5/2018 | Ploss et al. | G01F 1/66 |
| 2018/0266874 A1 | 9/2018 | Montoya et al. | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1 | 12/2018 | Lee et al. | G01N 29/11 |
| 2019/0011304 A1 | 1/2019 | Cunningham et al. | G01F 17/00 |
| 2019/0063984 A1 | 2/2019 | Bowley | G01F 23/2962 |
| 2019/0078927 A1 | 3/2019 | Takayama et al. | G01F 23/2965 |
| 2019/0137310 A1 | 5/2019 | Xiao et al. | G01F 1/06 |
| 2019/0195629 A1 | 6/2019 | Vaissiere | G01C 9/00 |
| 2019/0195830 A1 | 6/2019 | Tamura et al. | G01N 29/07 |
| 2019/0272496 A1 | 9/2019 | Moeller | G06Q 10/087 |
| 2020/0018628 A1 | 1/2020 | Head et al. | G21C 17/022 |
| 2020/0182736 A1 | 6/2020 | Kim et al. | G01M 3/2807 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0178879 A1 | 6/2022 | Bivolarsky et al. | G02N 29/028 |
| 2022/0178881 A1 | 6/2022 | Bivolarsky et al. | G01N 29/04 |

FOREIGN PATENT DOCUMENTS

| | | | |
|---|---|---|---|
| EP | 2450701 | 5/2012 | G01N 29/22 |
| EP | 2962096 | 8/2019 | G01L 1/255 |
| GB | 2192717 | 1/1990 | G01N 29/00 |
| KR | 200174618 | 3/2000 | G01N 29/24 |
| SU | WO 87/04793 | 8/1987 | G01N 29/00 |
| WO | WO 8809895 | 12/1988 | F16K 37/00 |
| WO | WO 2007/149605 | 12/2007 | |
| WO | WO 2014/167471 | 10/2014 | G01F 23/30 |
| WO | WO 2020/136945 | 7/2020 | G01F 23/296 |

OTHER PUBLICATIONS

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" Ultrasoncis vol. 62 (2015) pp. 223-236, Jun. 11, 2015, 14 pgs.

Amjad, Umar et al., "Detection and quantification of diameter reduction due to corrosion in reinforcing steel bars" Structural Health Monitoring 2015, vol. 14(5) 532-543, 12 pgs.

Amjad, Umar et al., "Detection and quantification of delamination in laminated plates from the phase of appropriate guided wave modes" Optical Engineering 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" Houston Chronicle, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" International Congress on Ultrasonics AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

Examination Report No. 1 issued in Australian Application No. 2020283140 dated Jan. 4, 2022, 6 pgs.

Examination Report No. 1 issued in Australian Patent Application No. 2020302919, dated Feb. 15, 2022, 4 pgs.

International Search Report and Written Opinion issued in PCT/US20/35404, dated Aug. 24, 2020, 11 pages.

International Search Report and Written Opinion issued in PCT/US20/39966, dated Sep. 18, 2020, 13 pages.

International Preliminary Report on Patentability issued in PCT/US20/35404 dated Nov. 16, 2021, 8 pgs.

International Preliminary Report on Patentability issued in PCT/US20/39966 dated Dec. 28, 2021, 10 pgs.

Notice of Allowance issued in U.S. Appl. No. 16/888,469, dated Dec. 23, 2020, 16 pgs.

Notice of Allowance issued in U.S. Appl. No. 17/148,122 dated Jun. 16, 2021, 8 pgs.

Notice of Allowance issued in U.S. Appl. No. 16/914,092 dated Oct. 28, 2021, 14 pgs.

Office Action issued in Canadian Patent Application No. 3,140,008, dated Feb. 14, 2022, 4 pgs.

Office Action issued in U.S. Appl. No. 16/888,469, dated Aug. 5, 2020, 8 pages.

Office Action issued in U.S. Appl. No. 16/888,469, dated Sep. 8, 2020, 20 pages.

Office Action issued in U.S. Appl. No. 16/914,092, dated Nov. 10, 2020, 22 pgs.

Office Action issued in U.S. Appl. No. 16/914,092, dated Mar. 1, 2021, 25 pgs.

Office Action issued in U.S. Appl. No. 16/914,092, dated Jun. 24, 2021, 24 pgs.

Office Action issued in U.S. Appl. No. 17/148,122, dated Mar. 2, 2021, 26 pgs.

U.S. Appl. No. 17/543,152, filed Dec. 6, 2021, Bivolarsky et al.

U.S. Appl. No. 17/542,872, filed Dec. 6, 2021, Bivolarsky et al.

International Search Report and Written Opinion issued in PCT/US21/61962 dated Feb. 16, 2022, 9 pgs.

International Search Report and Written Opinion issued in PCT/US21/61924 dated Feb. 16, 2022, 9 pgs.

International Search Report and Written Opinion issued in PCT/US21/62010 dated Feb. 16, 2022, 9 pgs.

International Search Report and Written Opinion issued in PCT/US21/61970 dated Feb. 18, 2022, 17 pgs.

International Search Report and Written Opinion issued in PCT/US21/61 925 dated Feb. 18. 2022, 9 pgs.

International Search Report and Written Opinion issued in PCT/US21/61646 dated Feb. 25, 2022, 9 pgs.

International Search Report and Written Opinion issued in PCT/US21/65664 dated Mar. 11, 2022, 9 pgs.

International Search Report and Written Opinion issued in PCT/US21/62001 dated Mar. 9, 2022, 9 pgs.

International Search Report and Written Opinion issued in PCT/US21/61926 dated Mar. 8, 2022, 9 pgs.

(56) References Cited

OTHER PUBLICATIONS

Notice of Acceptance issued in Australian Application No. 2020302919 dated Mar. 2, 2022, 4 pgs.
Notice of Acceptance issued in Australian Application No. 2020283140 dated Mar. 30, 2022, 4 pgs.
Notice of Allowance issued in Canadian Application No. 3,140,008 dated May 5, 2022, 1 pg.
Office Action issued in Australian Patent Application No. 2020283140, dated Mar. 18, 2022, 5 pgs.
Office Action issued in U.S. Appl. No. 17/543,200, dated Mar. 9, 2022, 8 pages.
Office Action issued in U.S. Appl. No. 17/542,461, dated Mar. 10, 2022, 18 pages.
Office Action issued in U.S. Appl. No. 17/542,465, dated Mar. 11, 2022, 22 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
Vermeersch, "Influence of substrate thickness on thermal impedance of microelectronic structures", Microelectronics Reliability, 47, 2007, pp. 437-443.
Office Action issued in U.S. Appl. No. 17/542,462, dated May 27, 2022, 28 pages.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/541,036, dated AUg. 9, 2022, 22 pages.
Office Action issued in U.S. Appl. No. 17/746,640, dated Aug. 18, 2022, 19 pages.
Notice of Allowance issued in U.S. Appl. No. 17/542,465, dated Jul. 11, 2022, 18 pages.
Notice of Allowance issued in U.S. Appl. No. 17/543,152, dated Jul. 29, 2022, 16 pages.
U.S. Appl. No. 17/540,021, filed Dec. 1, 2021, Heim et al.
U.S. Appl. No. 17/541,036, filed Dec. 2, 2021, Heim et al.
U.S. Appl. No. 17/5431,152, filed Dec. 6, 2021, Bivolarsky et al.
U.S. Appl. No. 17/542,814, filed Dec. 6, 2021, Burcham et al.
U.S. Appl. No. 17/542,461, filed Dec. 5, 2021, Burcham et al.
U.S. Appl. No. 17/542,465, filed Dec. 5, 2021, Bivolarsky et al.
U.S. Appl. No. 17/543,200, filed Dec. 6, 2021, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.
U.S. Appl. No. 17/746,622, filed May 17, 2022, Bivolarsky et al.
U.S. Appl. No. 17/746,640, filed May 17, 2022, Bivolarsky et al.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Notice of Allowance issued in U.S. Appl. No. 17/543,200, dated Nov. 3, 2022, 16 pages.

\* cited by examiner

IN-WALL MULTI-BOUNCE MATERIAL PROPERTY DETECTION AND ACOUSTIC SIGNAL AMPLIFICATION

CROSS REFERENCE TO RELATED APPLICATION

This application claims benefit of U.S. Provisional Application Ser. No. 63/121,763 entitled, "Multi-Bounce Material Property Detection" filed Dec. 4, 2020, and U.S. Provisional Application Ser. No. 63/122,344 entitled, "In-Wall Multi-Bounce Acoustic Signal Amplification" filed Dec. 7, 2020, the entire disclosures of which are incorporated herein by reference.

FIELD OF THE DISCLOSURE

The present disclosure is generally related to acoustic signal processing and analysis, and more particularly is related to in-wall multi-bounce material property detection and acoustic signal amplification.

BACKGROUND OF THE DISCLOSURE

Pipes and pipelines are commonly used in a variety of industries to transport fluids. For instance, water pipes transport potable and sewer water in urban areas, pipes are used to transport chemicals within factories, and pipelines are used within the oil and gas industry for transporting petroleum products within refineries or between various locations. To monitor the fluid within the pipes and pipeline, conventional technologies such as pressure gauges and various sensors are commonly used. More recently, acoustic-based sensors have been used to monitor the fluid or determine characteristics of the fluid.

For instance, acoustic signals are commonly used in assessing fluids and other materials within containers, such as containers and pipelines used to store oil and gas within the petroleum industry. There are many reasons to use acoustic waves for measurements of fluids or materials in a container or other type of enclosure. For instance, some containers are not easily accessible, such as underground storage tanks and large, multi-story fuel storage containers. Acoustic waves for measurements are also especially useful for metal enclosures and other non-transparent enclosures that encapsulate potentially hazardous materials, such as oil, gas, fuel, and various chemicals at different temperatures. These may be prevalent in processing plants, nuclear power stations, power grid transformers, and refineries.

In use, an acoustic sensor or transducer is positioned proximate to the container and an acoustic signal is transmitted into the container sidewall. The coupling of the transducer to the container is usually designed to minimize the impact of mounting the transducer to the container. When the signal crosses the sidewall of the container from the outside of the container to the inside, it loses significant amounts of energy, especially when the signal reaches the impedance barrier at the inside surface of the container sidewall. The loss of signal energy at the acoustic impedance barrier inside surface of the container sidewall is determined by one or more properties of the fluid material inside the container, as well as the properties of the material forming the sidewall of the container, and the temperature. For instance, in case of dense liquids, like crude oil, almost 80% to 90% of the energy of the acoustic wave is lost crossing the impedance barrier between crude oil and the sidewall of the container. Less dense liquids and gasses are prone to blocking even mode energy at the impedance barrier on the inside of the container.

In the case of liquids flowing through a pipeline, the fluid materials being transported often have a noticeably different acoustic impedance from the material used to form the pipeline wall, often a metal material, such as cast iron, steel, aluminum, or similar materials. This difference in acoustic impedance leads to significant reflection of an acoustic or ultrasound wave of an acoustic sensor which crosses this impedance barrier, and as a result, the strength of the transmitted signal into fluid can be lower than desired. With petroleum products specifically, this problem occurs due to petroleum paraffin wax deposits forming on the inside of the pipeline wall. Similarly, with gasses flowing through a pipe, the impedance barrier on the inside surface of the pipe wall can reflect most of the signal back into the pipe wall, thereby preventing accurate signal transmission.

Thus, a heretofore unaddressed need exists in the industry to address the aforementioned deficiencies and inadequacies.

SUMMARY OF THE DISCLOSURE

Embodiments of the present disclosure provide an apparatus, system, and related methods for multi-bounce material property detection. Briefly described, in architecture, one embodiment of the system, among others, can be implemented as follows. The apparatus has a first acoustic transducer positioned on an exterior sidewall of a pipe carrying a quantity of fluid therein. An acoustic signal is transmitted by the first acoustic transducer into the sidewall of the pipe from an exterior surface thereof. At least a portion of the acoustic signal reflects off an interior surface of the sidewall of the pipe. A second acoustic transducer is positioned on the exterior sidewall of the pipe. The reflected acoustic signal is received at the second acoustic transducer. The reflected acoustic signal provides an indication of a material property of the pipe or a material within the pipe.

The present disclosure can also be viewed as providing methods for multi-bounce material property detection. In this regard, one embodiment of such a method, among others, can be broadly summarized by the following steps: positioning a first acoustic transducer on an exterior sidewall of a pipe carrying a quantity of fluid therein; transmitting an acoustic signal with the first acoustic transducer into the sidewall of the pipe from an exterior surface thereof; reflecting at least a portion of the acoustic signal off an interior surface of the sidewall of the pipe; positioning a second acoustic transducer on the exterior sidewall of the pipe; and receiving the reflected acoustic signal at the second acoustic transducer, wherein the reflected acoustic signal provides an indication of a material property of the pipe or a material within the pipe.

The present disclosure can also be viewed as providing an apparatus for in-wall, multi-bounce acoustic signal amplification. Briefly described, in architecture, one embodiment of the apparatus, among others, can be implemented as follows. A vessel contains a quantity of material. First and second acoustic transducers are positioned on a sidewall of the vessel, wherein the first acoustic transducer is positioned at a different location along the sidewall than the second acoustic transducer. A first acoustic signal is transmitted into the sidewall of the vessel from the first acoustic transducer, wherein the first acoustic signal reflects between an interior surface of the sidewall and an exterior surface of the sidewall. A second acoustic signal is transmitted into the sidewall of the vessel from the second acoustic transducer, wherein the second acoustic signal is phase synchronized with the first acoustic signal, and wherein the second acoustic signal amplifies the first acoustic signal.

The present disclosure can also be viewed as providing methods for in-wall, multi-bounce acoustic signal amplification. In this regard, one embodiment of such a method, among others, can be broadly summarized by the following steps: providing a vessel containing a quantity of material; positioning first and second acoustic transducers on a sidewall of the vessel, wherein the first acoustic transducer is positioned at a different location along the sidewall than the second acoustic transducer; transmitting a first acoustic signal into the sidewall of the vessel from the first acoustic transducer; reflecting the first acoustic signal between an interior surface of the sidewall and an exterior surface of the sidewall; phase synchronizing a second acoustic signal with the first acoustic signal; and transmitting the second acoustic signal into the sidewall of the vessel from the second acoustic transducer, whereby the second acoustic signal amplifies the first acoustic signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve over the shortcomings of the conventional devices, as discussed in the Background, the subject disclosure is directed to an apparatus, system, and related methods for multi-bounce material property detection which can be used to analyze, assess, or otherwise determine the material property state of pipes, pipelines, and other structures for transporting and/or holding fluids, such as holding vessels, containers, or the like. The subject disclosure is also directed to an apparatus, system, and related methods for using multi-bounce techniques for acoustic signal amplification, which can provide improvements and benefits when acoustic signal sensing techniques are used with dense materials and liquids, such as crude oil.

Figure 1:
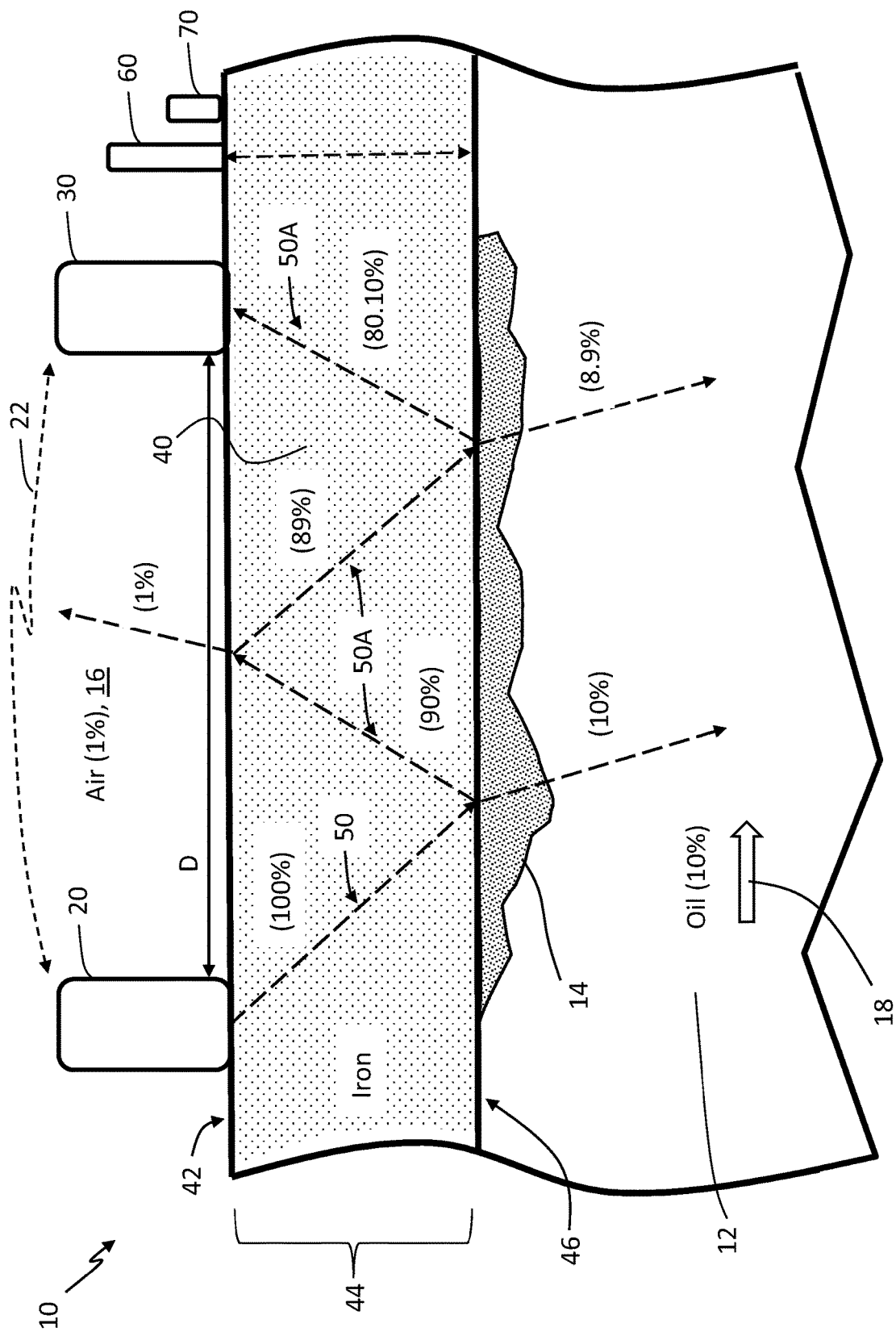
FIG. 1 is a diagrammatical cross-sectional illustration of an apparatus for multi-bounce material property detection, in accordance with a first exemplary embodiment of the present disclosure.

Improved multi-bounce material property detection can provide substantial benefits over the current use of acoustic signals for material detection. To this end, with reference first to FIG. 1, the apparatus for multi-bounce material property detection 10 is depicted in accordance with a first exemplary embodiment of the present disclosure. The apparatus for multi-bounce material property detection 10, which may be referred to herein simply as 'apparatus 10' allows for the detection of a material property, such as a pipe or pipeline, by increasing the effect that acoustically different materials have on a reflected signal by using a multi-bounce approach. As shown in FIG. 1, a first acoustic transducer 20 is positioned on a pipe 40, and in particular, attached to an exterior surface 42 of a sidewall 44 of the pipe 40 carrying a quantity of fluid 12 therein. While the pipe 40 may carry a variety of different fluids, for clarity in disclosure, this disclosure uses oil as the exemplary fluid 12, as depicted within FIG. 1. The oil 12 is contained within the pipe 40 and is often flowing or moving through the pipe 40, such as along flow direction arrow 18. Along the interior surface 46 of the sidewall 44 of the pipe 40, i.e., the surface of the pipe 40 sidewall 44 which is in contact with the fluid 12, a quantity of particulate 14 may build up, as depicted in FIG. 1. With pipes used for transporting oil and gas, this particulate is often paraffin wax deposits 14, but the particulate may also include other materials and substances. When the apparatus 10 is used with pipes carrying other materials, the particulate may include other substances. For example, pipes carrying water may have a particulate formed from a mineral buildup within the pipe, such as from the accumulation of calcium or other minerals.

The first acoustic transducer 20 or acoustic sensor transmits an acoustic signal 50 into the sidewall 44 of the pipe 40 from the exterior surface 42 thereof. This acoustic signal 50 may be a sheer wave which travels through the sidewall 44 of the pipe 40 and reflects multiple times from both surfaces of the pipe 40 sidewall 44, e.g., at the interfaces of the pipe, from and between the exterior surface 42 of the sidewall 44 and the interface with the air 16, and from the interior surface 46 of the sidewall 44 and the interface with the fluid 12. A second acoustic transducer 30 is positioned on the exterior surface 42 of the sidewall 44 of the pipe 40 and it receives the reflected acoustic signal 50A. The reflections from the inner surface 46 of the sidewall 44 are due to a lower impedance of material, namely, the wall material of the pipe 40, commonly cast iron or a similar metal, versus the material of the fluid 12 or gas within the pipe 40 at that interface. Similarly, the reflections of the reflected acoustic signal 50A from the outside surface 42 of the pipe 40 relative to the air 16 or atmosphere exterior of the pipe 40 are due to an impedance difference therebetween at that interface.

When the acoustic signal 50 is transmitted, the waves of the acoustic signal 50 experience phase change when reflecting from a lower impedance barrier on inside surface 46 of the sidewall 44, but they do not change phase when reflecting from exterior surface 42 abutting the outside air 16. This phase change can be determined upon receipt of the reflected acoustic signal 50A at the second acoustic transducer 30, and when the phase change is identified by the second acoustic transducer 30 (or another transducer or component of the apparatus 10), it is possible to determine whether the number of reflected signal 50A bounces within the sidewall 44 of the pipe 40 is an odd number or an even number. At the exterior surface 42 abutting the air 16, the reflection coefficient of the boundary may be determined by measuring the ambient temperature, humidity, and barometric pressure of air 16. These measurements may be used to calculate the reflection coefficient at this boundary.

It is noted that acoustic waves traveling in a solid material experience a phase reversal, which is a 180° change, when they reflect from a boundary with air. Acoustic waves traveling in air do not experience a phase change when they reflect from a solid material, but they do exhibit a 180° change when reflecting from a region of that material, or another material, with lower acoustic impedance. With the apparatus 10, this phase reversal is the same for the air and a liquid material 12 within the container, such that alter two reflections, the acoustic wave may be exactly in its original position.

At the interface between the inner surface 46 of the pipe 40 sidewall 44 and the fluid 12 within the pipe 40, it is noted that multiple signal reflections 50A of the original signal 50, which may be understood or referred to as bounces or echoes, may act to increase the effect from the impedance of the material in the pipe 40. The second transducer 30 is placed at a predetermined location on the exterior surface 42 of the pipe 40 to receive the reflected signal 50A. For example, the distance (D) between the first and second acoustic transducers 20, 30, and/or a location of the second transducer 30 irrespective of the first transducer 20, may be determined by the configuration of the apparatus 10. The second acoustic transducer 30 may also be moveable along the pipe 40, such as rotatable, movable in a linear direction, movable tangentially, or movable in another direction. With the position of the second transducer 30 known, it is possible to measure the properties of the fluid or gas material 12 inside of the pipe 40, as well as the properties of the sidewall 44 of the pipe 40, including thickness and detonation at the same time. Accordingly, this approach enables the measurement of a small signal difference of the reflected signal 50A, which can be used to determine, assess, or analyze the material properties of the pipe 40 or the fluid therein.

As a further illustration of the apparatus 10, in FIG. 1, exemplary signal differences are provided in parentheses, such that it can be seen how the original signal 50 at 100% strength will produce a first reflected signal 50A of only 90% when 10% of the signal strength is not reflected back at the inner surface 46 of the pipe 40 sidewall 44. When the reflected signal 50A reflects off the exterior surface 42 of the sidewall 44, it loses 1% strength, thereby resulting in a reflected signal 50A of 89%. Eventually, after reflecting between the exterior surface 42 and the interior surface 46 of the sidewall 44 of the pipe 42, the reflected signal 50A will experience various decreases in signal strength until the reflected signal 50A with the final strength is received by the second transducer 30. These small signal strength differences or decreases can then be used to make determinations about the pipe 40 or materials therein. For instance, in the case of oil and gas being transported through the pipe 40, it is possible to detect the presence of paraffin wax deposits 14, as well as other materials which may accumulate or build up within the pipe 40, since the decrease in signal strength will be different for a signal refection at the interior surface 46 when deposits 14 are positioned on the interior surface 46 of the pipe 40 versus when the pipe 40 is clean. Thus, the apparatus 10 may be used to provide an indication of a material property of the pipe 40 and/or a material within the pipe 40 based on the reflected acoustic signal 50A, and in particular, based on the final signal strength at the second transducer 30 and a determination of the number of signal bounces the signal experiences.

The apparatus 10 may offer substantial benefits with materials within pipes 40 which enable a discernable difference in impedance barrier between the pipe 40 sidewall 44 and the material within the pipe. As an example, materials that fall in this category may be gasses where only approximately 0.01% of the acoustic signal 50 is penetrating the impedance barrier of the inside surface 46 of the sidewall 44 of the pipe 40. In the case of oil and gas pipelines 40, it has been found that with paraffin wax, a common material which creates deposits within the pipe 40, approximately 0.00002% of the longitudinal signal or approximately 0.00004% of the shear signal penetrates the sidewall 44 and transfers into the material 12 or deposits 14 within the pipe 40. The rest of the acoustic signal 50 is reflected back into the sidewall 44. It is possible to increase the signal 50 strength substantially, such as by 10 times or more as discussed relative to FIGS. 5-9 which can increase the signal 50 and will allow for identifiable measurements of gases 12 and paraffin wax deposits 14 within a pipe 40.

Using a phase shift and frequency change to create a resonant wave, it is possible to measure the size of the sidewall 44 at the same time the apparatus is measuring the attenuation of the signal 50, including the reflected signal 50A from the interior surface 46 of the sidewall 44. The measurement of the sidewall 44 of the pipe 40 may be achieved using a first bounce or echo from the outside surface 42 of the sidewall 44 using longitudinal waves transmitted from a density transducer 60, as depicted in FIG. 1. This impedance barrier reflection calculation may be compensated for temperature with a temperature sensor 70 which may be positioned at a location proximate to the density transducer 60.

Figure 2:
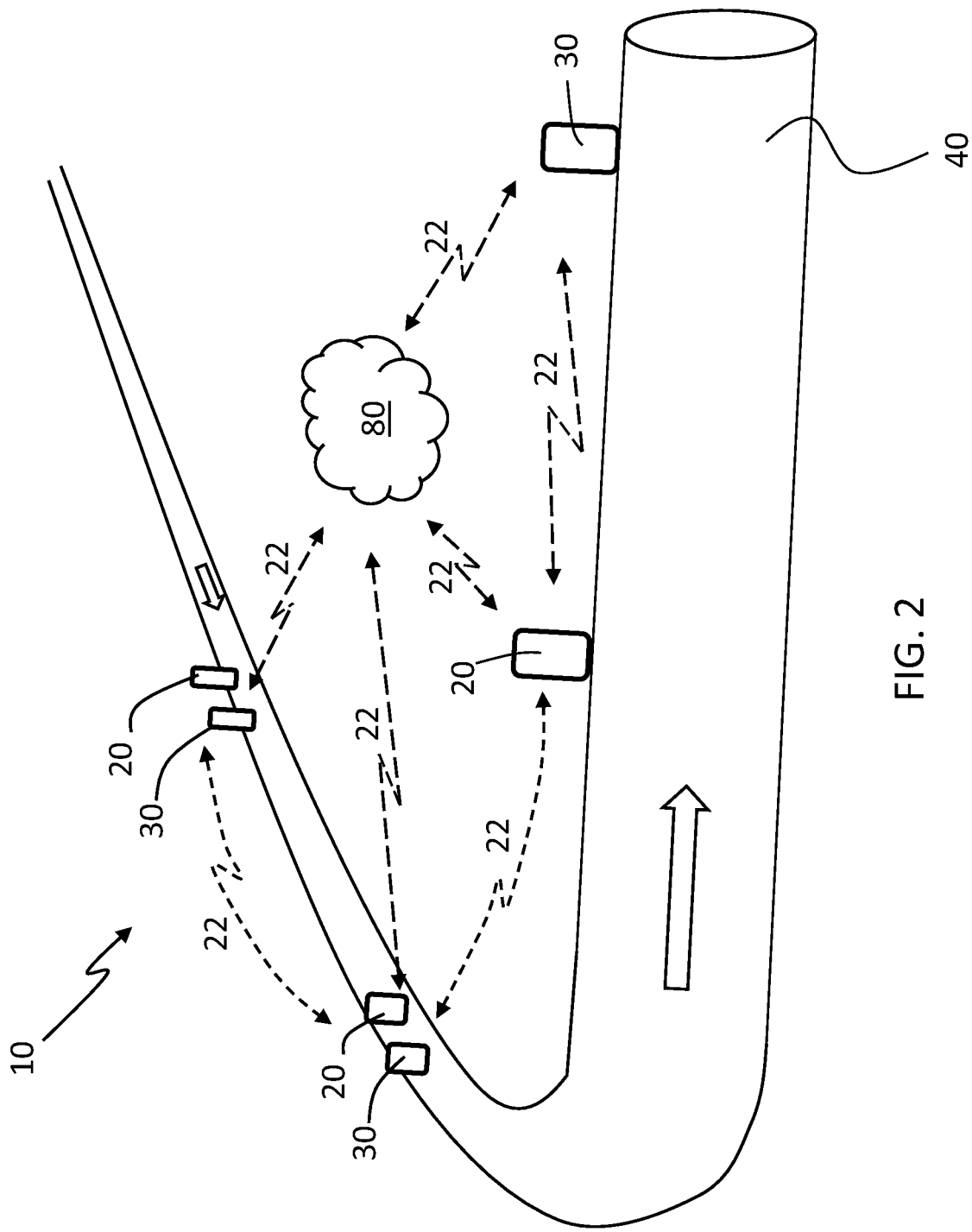
FIG. 2 is a diagrammatical perspective view illustration of the apparatus for multi-bounce material property detection of FIG. 1, in accordance with the first exemplary embodiment of the present disclosure.

It is noted that both the sending acoustic transducer 20 and the second transducer 30 which receives the reflected signal 50A are connected, such as through a wireless or wired connection 22, such that the two transducers 20, 30 are synchronized to measure the time of flight between the two locations of the transducers 20, 30. The delay in the synchronization between the transducers 20, 30 may be used to correct the time of flight computations. The connection 22 between the transducers 20, 30 may be part of a larger communication network which includes multiple pairs of transducers 20, 30. For example, FIG. 2 is a diagrammatical perspective view illustration of the apparatus 10 of FIG. 1, in accordance with the first exemplary embodiment of the present disclosure, which depicts an elongated section of a pipe 40 which has multiple pairs of transducers 20, 30, all of which have communication connections 22 to a network 80, such as a cloud computing network. This architecture may allow each of the first and second transducers 20, 30 to communicate with one another, respectively, through indirect communication through the network 80. Alternatively, or in addition, the transducers 20, 30 may also have direct communication connections 22 therebetween, such that the transducers 20, 30 can communicate with one another without a network.

Relative to FIG. 2, it is noted that any number of transducer 20, 30 pairs may be used with any given length of pipe 40. For example, the pairs of transducers 20, 30 may be located at specific intervals from other pairs, such as every 1 foot, 10 feet, 100 feet, 1,000 feet, or any other distance. It is also noted that the transducers 20, 30 may be positioned on various parts of the pipe 40, including the top (as shown in FIG. 2), but equally anywhere else around the circumference of the pipe 40. In one example, it may be preferable to locate transducers 20, 30 in different circumferential or radial positions on a pipe 40 to ensure that appropriate sensing of deposits can occur within all radial parts of the pipe 40.

Figure 3:
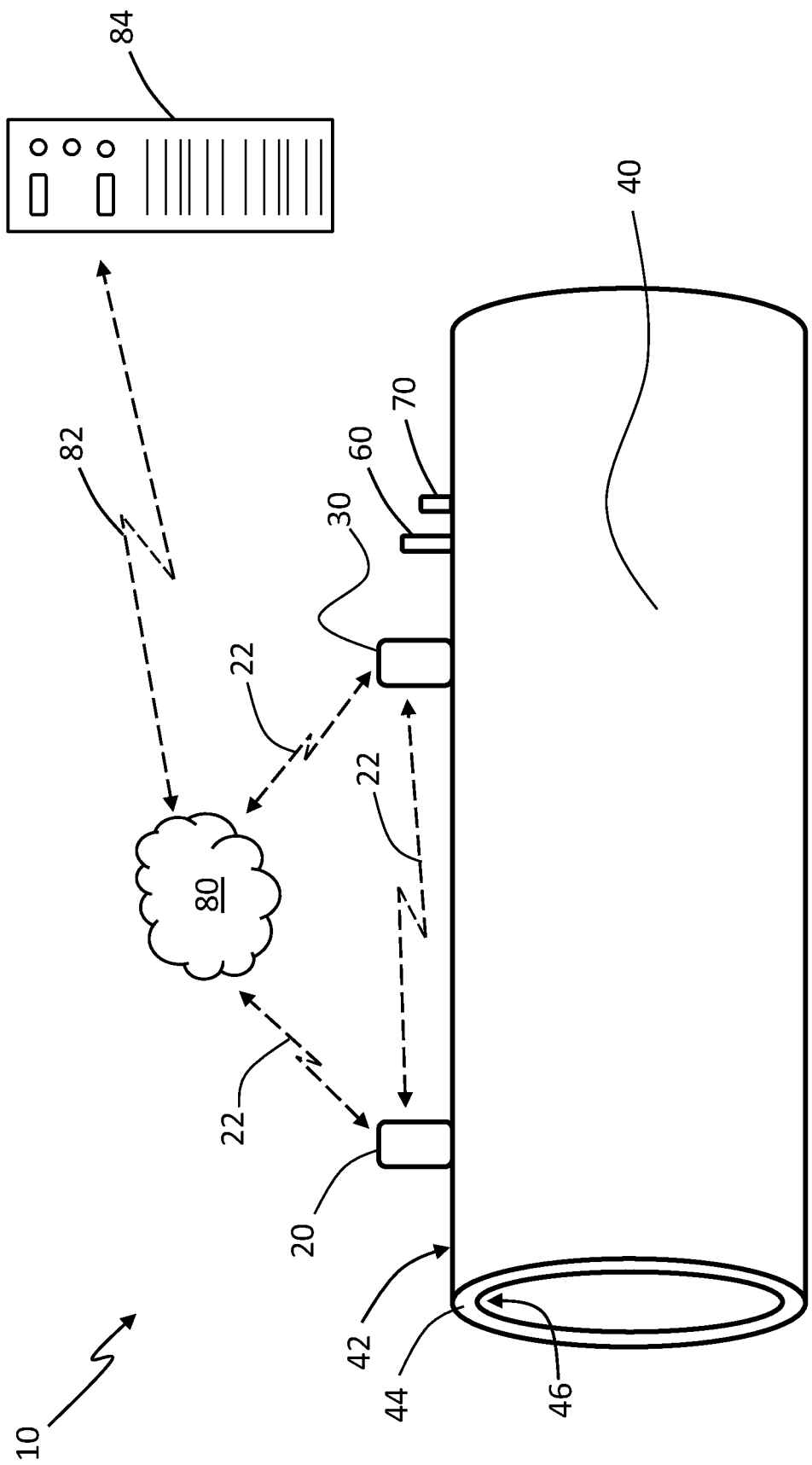
FIG. 3 is a diagrammatical perspective view illustration of the apparatus for multi-bounce material property detection of FIG. 1, in accordance with the first exemplary embodiment of the present disclosure.

It is also noted that multiple pairs of transducers 20, 30 can be used in an installation on the same pipe 40 to measure different parameters of the pipe 40, and the processing that the liquid 12 within the pipe 40 is going through. All of the pairs of transducers 20, 30 may be connected together, individually as pairs, or together with communication systems. For example, it may be possible to use the cloud network 80 of FIG. 2 which facilitates information to be sent from one pair of transducers 20, 30 to another. FIG. 3 is a diagrammatical perspective view illustration of the apparatus for multi-bounce material property detection of FIG. 1, in accordance with the first exemplary embodiment of the present disclosure, which uses a cloud network 80.

As shown in FIG. 3, the cloud network 80 or cloud computing system may communicate signal data from the numerous pairs of transducers 20, 30 through wireless or wired communication paths 82 to computerized device 84 with processor, such as at control centers. In this way, the properties of the same section of the material within the pipe 40 can be followed as it travels through a network of interconnected pipes within the same facility. For example, it may be possible to follow or track the same batch of oil through a network of pipes 40 within an oil refinery, or the same batch of chemical as it moves through pipes 40 within a chemical plant, such that it's status or characteristics can be identified throughout the stages of processing. It is also noted that the cloud network 80 may utilize advanced software and data processing techniques, such as those that utilize artificial intelligence (AI) for processing the data coming from the transducers 20, 30, and to connect the status of the fluid within the pipes 40 with a control system of the refinery or plant.

Figure 4:
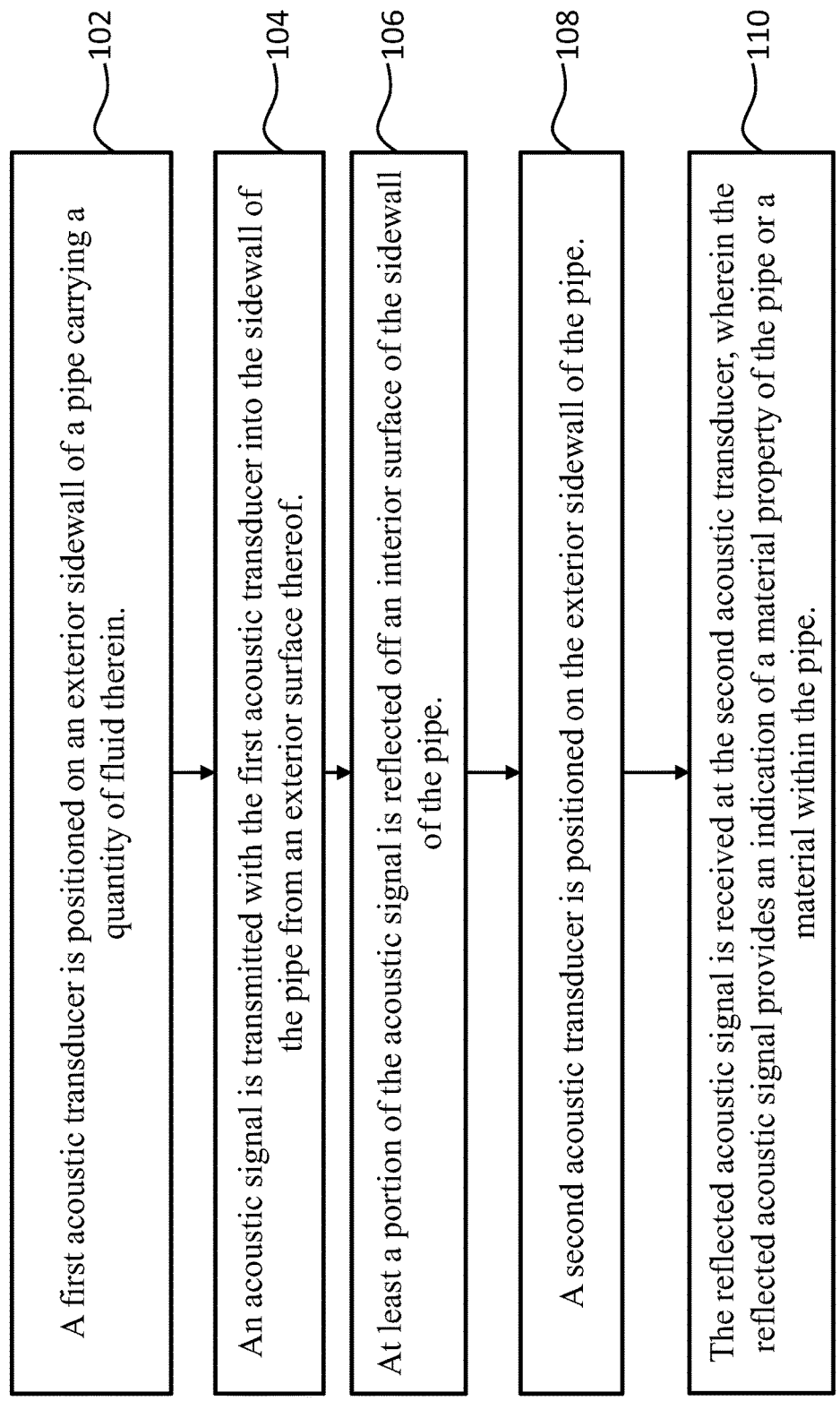
FIG. 4 is a flowchart illustrating a method of multi-bounce material property, in accordance with the first exemplary embodiment of the disclosure.

FIG. 4 is a flowchart 100 illustrating a method for multi-bounce material property detection, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a first acoustic transducer is positioned on an exterior sidewall of a pipe carrying a quantity of fluid therein. An acoustic signal is transmitted with the first acoustic transducer into the sidewall of the pipe from an exterior surface thereof (block 104). At least a portion of the acoustic signal is reflected off an interior surface of the sidewall of the pipe (block 106). A second acoustic transducer is positioned on the exterior sidewall of the pipe (block 108). The reflected acoustic signal is received at the second acoustic transducer, wherein the reflected acoustic signal provides an indication of a material property of the pipe or a material within the pipe (block 110). Any number of additional steps, functions, processes, or variants thereof may be included in the method, including any disclosed relative to any other figure of this disclosure.

To further improve the use of multi-bounce material property detection described relative to FIGS. 1-4, or as a separate improvement to the use of acoustic signal processing, it may be possible to increase the acoustic signal strength substantially which can improve the ability to detect materials or other properties of a pipeline or material vessel architecture. One such method of increasing the signal strength is to use in-wall, multi-bounce acoustic signal amplification, which is described relative to FIG. 5, which is a diagrammatical, cross-sectional illustration of an apparatus for in-wall, multi-bounce acoustic signal amplification 210, in accordance with a first exemplary embodiment of the present disclosure. The apparatus for in-wall, multi-bounce acoustic signal amplification 210, which may be referred to herein simply as 'apparatus 210', can be used to amplify an acoustic signal transmitted into a structure, such as the sidewall 242 of a container 240, a pipe, or a similar structure, which in turn, can aid in acoustic material detection within the structure. Accordingly, as the initial wave is reflected or bounced inside the wall of the structure, a second acoustic wave is effectively superimposed over the reflected wave to increase its amplitude or energy. In this way, the additional wave adds its amplitude over the remaining amplitude from the reflected wave, and thus increases the overall energy of the combined waves that will penetrate the inside surface of the structure wall.

Figure 5:
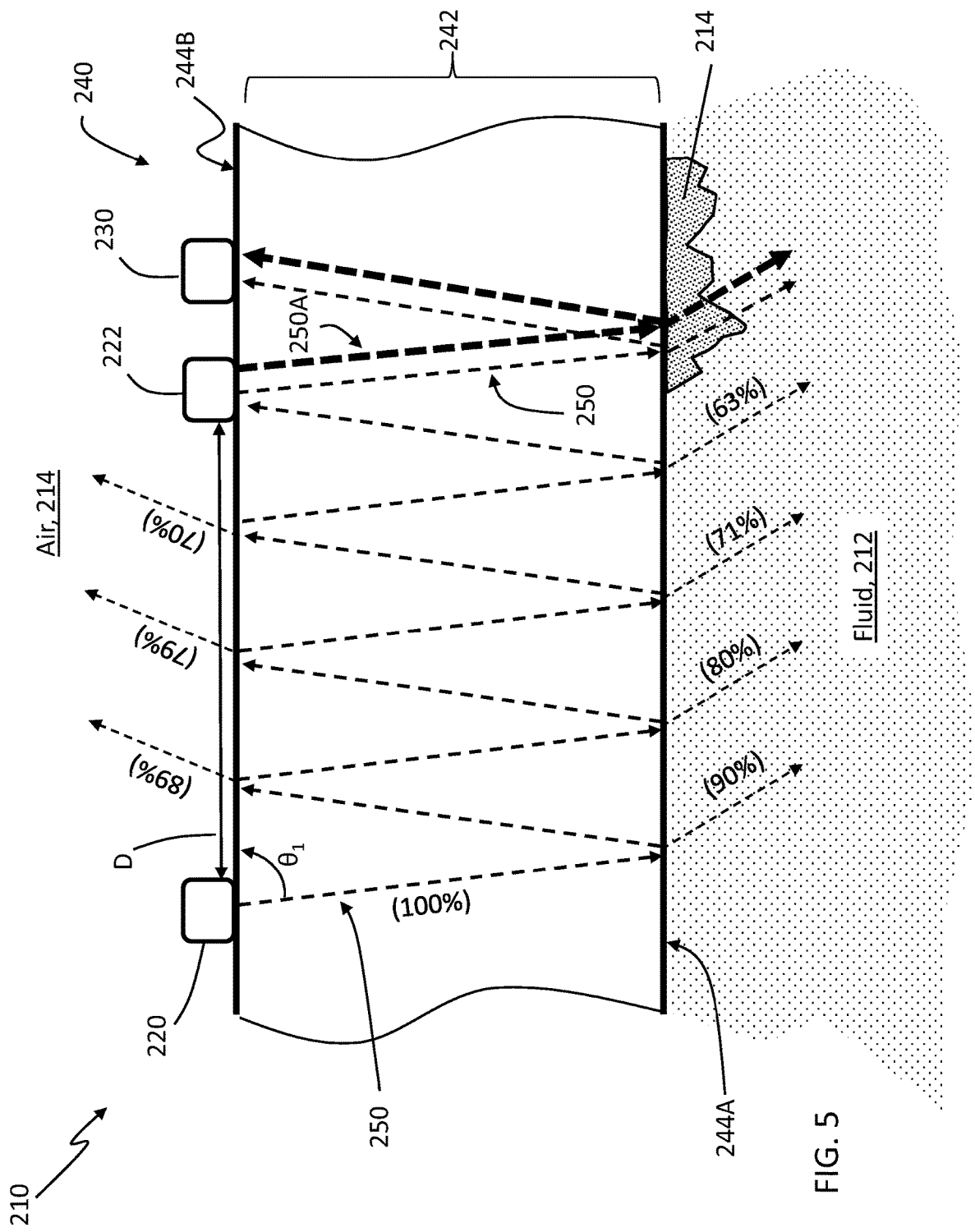
FIG. 5 is a diagrammatical, cross-sectional illustration of an apparatus for in-wall, multi-bounce acoustic signal amplification, in accordance with a second exemplary embodiment of the present disclosure.

With reference to FIG. 5, the apparatus 210 includes a vessel or container 240 containing, transporting, or otherwise holding a quantity of material 212, such as an oil or gas product. In FIG. 5, a portion of the container 240 is depicted, such that a portion of the sidewall 242 of the container 240 can be seen separating the material 212 being housed relative to an outside atmosphere of the container 240 where the ambient air 214 is located. It is noted that the container 240 may include any type of fluid or material-holding vessel, and any type of fluid or material may be stored, transported, or housed therein. For clarity, this disclosure uses gas and oil as the exemplary material and a gas or oil storage vessel as the exemplary container 240. Depending on the type of material 212 within the container 240, a quantity of buildup or material precipitate 214 may accumulate on the inner surface 244A of the sidewall 242 of the container 240.

Two or more acoustic transducers 220, 222 are positioned on the sidewall 242 of the container 240, such as by being affixed to the exterior surface 244B of the container 240. The first acoustic transducer 220 is positioned at a different location along the sidewall 242 than the second acoustic transducer 222, such that there is a distance (D) between the transducers 220, 222 for the acoustic signal 250 transmitted from the first transducer 220 to bounce in the sidewall 242 prior to reaching the second transducer 222. The first acoustic transducer 220 transmits an acoustic signal 250 at a predetermined angle ($\theta_1$) into the sidewall 242 of the container 240. As can be seen, the signal 250 travels from the exterior surface 244B through the sidewall 242 and to the interior surface 244A. At the interior surface 244A, the signal 250 loses a portion of its energy, such as 10%, into the material 212, while the signal reflects or bounces back towards the exterior surface 244B. Here, at the exterior surface 244B, the signal 250 loses more energy, such as 1%, due to the exterior surface's 244B position abutting the air 214, and the signal 250 reflects back to the interior surface 244A. The signal 250 continues to bounce or reflect through the sidewall 242, losing portions of its energy at each reflection.

Eventually, the signal 250 reaches the second acoustic transducer 222, which is positioned on the exterior surface 244B of the sidewall 242. Here, the second acoustic transducer 222 transmits an additional acoustic signal 250A into the sidewall 242 of the container 240. The additional signal 250A is phase synchronized with the first acoustic signal 250, such that the second signal 250A acts to amplify or increase the amplitude of the first signal 250. Phase synchronization may include syncing by a single sine wave or a group of waves, such as a chirp for the signal maximum. Additionally, it is possible to use a synchronizing transducer sensor 230 along the exterior surface 244B of the sidewall 242 to synchronize the transmission of the additional signal 250A with the reflection of the first signal 250. The synchronizing transducer sensor 230 may be permanent or it may be used only at setup of the apparatus 210.

As depicted in FIG. 5, the signal amplification from the second transducer 222 is positioned after the signal bounces a number of times. However, there are multiple signal 250 bounces between the first and the second transducers 220, 222 that can also be used for signal amplification, depending on the angle of the initial signal 250 and the thickness of the sidewall 242. The position of the second acoustic transducer 222 may be determined at the initial setup of the transducers 220, 222, which may be correlated to the amplification that is needed to solve the particular needs of the setup, e.g., the needs of the container 240 or material 212 therein. This is usually determined by the class of materials 212 within the container 40 that need to be measured and the parameters that characterize these materials 212.

Figure 6:
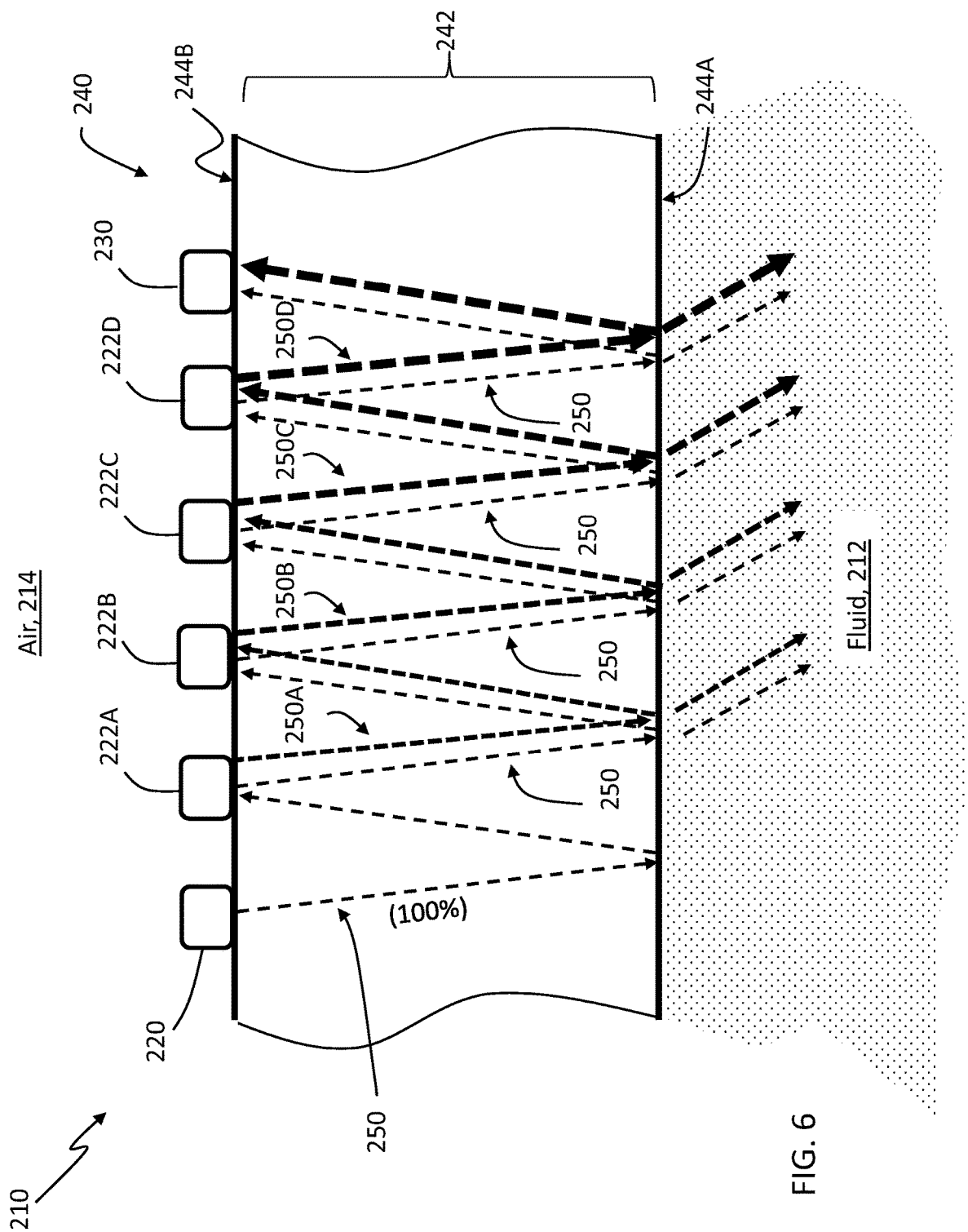
FIG. 6 is a diagrammatical, cross-sectional illustration of the apparatus for in-wall, multi-bounce acoustic signal amplification of FIG. 5, in accordance with the second exemplary embodiment of the present disclosure.

Additionally, it is noted that the process and control needs of the plant, factory, or setting where the apparatus 210 is installed may play a role in the apparatus 210 setup and the pattern of the signals 250, 250A that are used, including the number of beams and how many are at the same energy with decaying function and how many are boosted. For example, FIG. 6 is a diagrammatical, cross-sectional illustration of the apparatus 210, in accordance with the second exemplary embodiment of the present disclosure, which uses a maximum number of transducers 220, 222. As shown, a first transducer 220 transmits the acoustic signal 250, and a second transducer 222A-222D is placed at each point of reflection along the exterior surface 244B of the container 240. The maximum number of boosting may occur when the acoustic transducers 220, 222A-222D are placed at each bounce from the outside surface 244B of the container 240, and when the signals 250, 250A, 250B, 250C, and 250D are transmitted from all transducers 220, 222A-222D are all synchronized. Synchronization may be achieved when the delay between each of the acoustic transducers 220, 222A-222D is accounted for and phase differences are compensated, so all signals 250, 250A-250D are with the same phase. It is noted that any number of acoustic transducers 220, 222A-222D may be used in any given example, in any arrangement, such as at each exterior reflection of the signals 250, 250A-250D, at every other reflection of the signals 250, 250A-250D, etc.

With reference to FIG. 5, commonly, the physical space and the interference between the acoustic transducers 220, 222 are the factors that can create practical limitations to multiple transducers being placed in close proximity next to each other. And, the application needs for signal amplification can also be a determinative factor, such as where a certain signal amplification is desired in a small physical space. While the apparatus 210 may be used with a container 240 having a sidewall 242 with different material compositions of the sidewall 242 and different sidewall 242 thickness, it is noted that a container 240 with thin sidewalls 242 has been found to have a nearly negligent wall attenuation loss, which leaves only the material 212 inside the container 240 as a controlling parameter due to the impedance barrier signal loss. The acoustic transducer 220 transmitting the signal 250 may be used to determine the material composition of the sidewall 242 with the first echo when processing the signal 250.

With regards to the acoustic waves, the types of waves that are sent from the acoustic transducers 220, 222 through the sidewall 242 can be shear and or longitudinal waves since the incidence angles can be set to match the conditions of the apparatus 210. Using this technique, shear wave signals can be amplified more than longitudinal waves. However, the absorption of the signal and the reflection may reduce the effectiveness of the signal amplification if too many signal reflections or bounces occur. Using sheer wave through the sidewall 242 of the container 240 may increase the amount of energy that is transmitted, commonly, by more than double. However, the shear waves are generated with smaller initial energy. The signals 250, 250A must be phase synchronized since their amplitudes are combined in the second acoustic transducer 222 before processing of the signal 250 and transmitting the second signal 250A. The wave physical properties may be used to amplify the signal 250 by superimposing the additional wave 250A, or even further waves, over time. It is noted that attenuation is one of the parameters most sensitive to the material parameters and temperature. Acoustic wave absorption, therefore, may be compensated for temperature and is measured at different frequencies.

Figure 7:
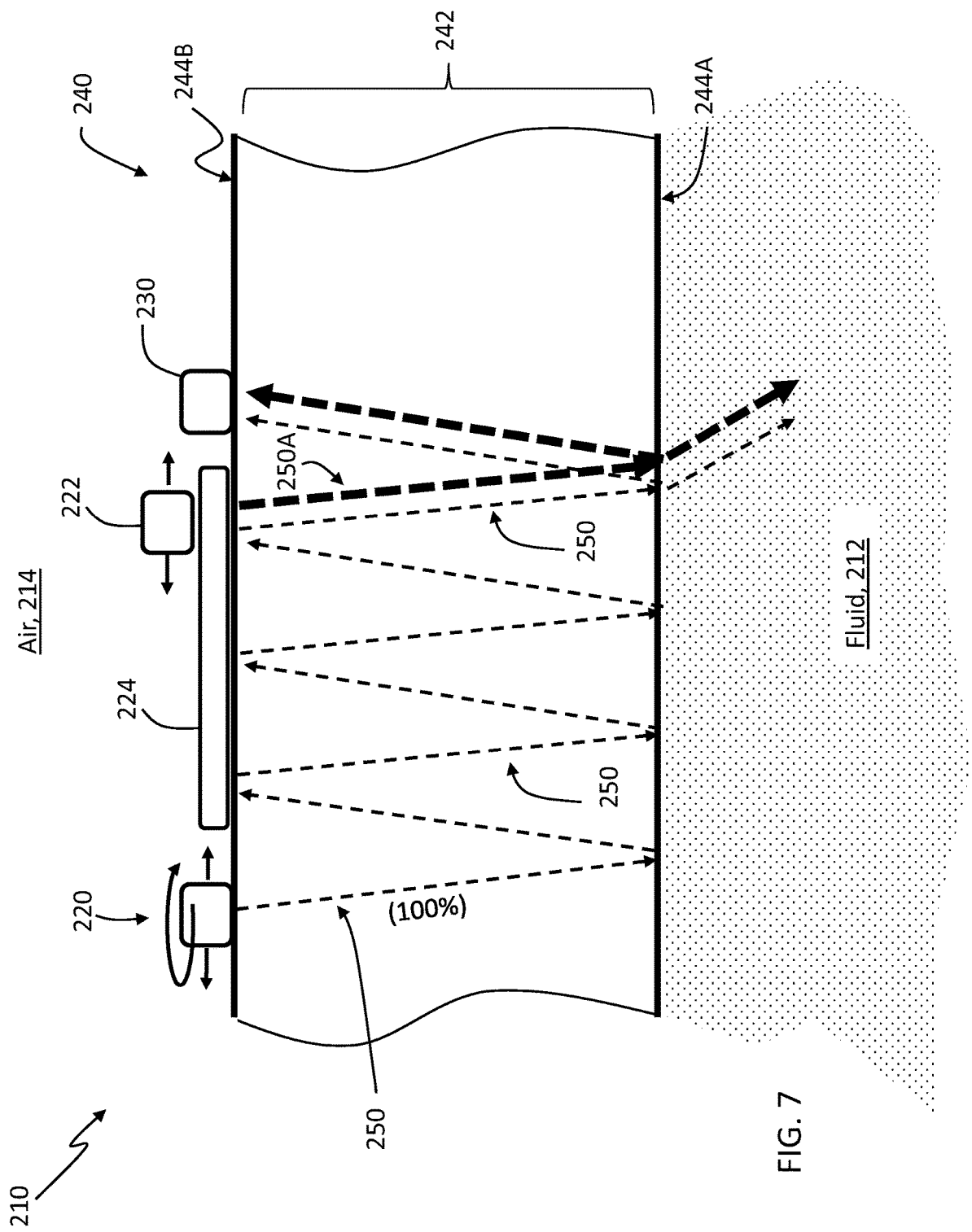
FIG. 7 is a diagrammatical, cross-sectional illustration of the apparatus for in-wall, multi-bounce acoustic signal amplification of FIG. 5, in accordance with the second exemplary embodiment of the present disclosure.
Figure 8:
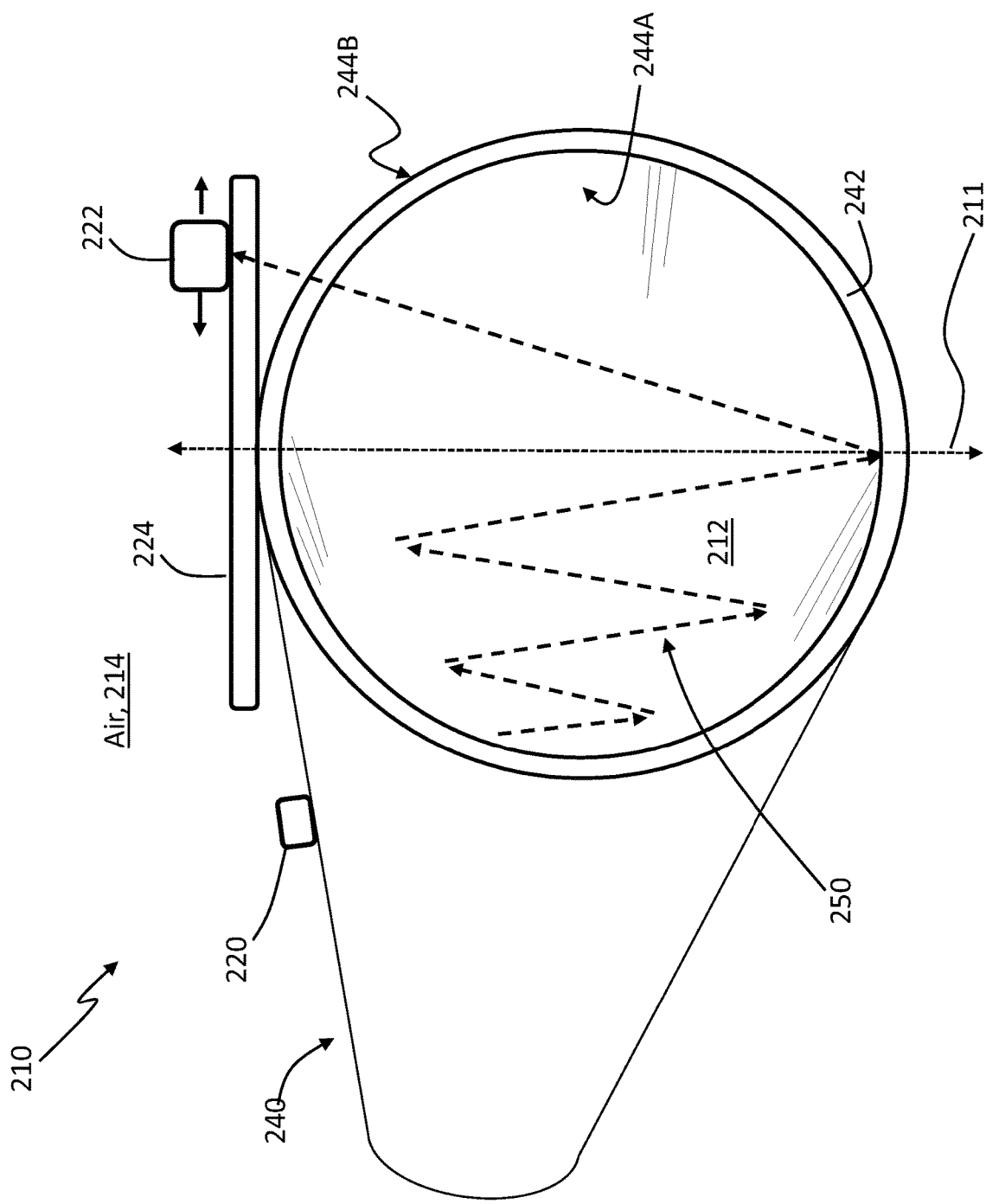
FIG. 8 is a diagrammatical perspective view illustration of the apparatus for in-wall, multi-bounce acoustic signal amplification of FIG. 5, in accordance with the second exemplary embodiment of the present disclosure.

Additionally, it is noted the second transducer 222 can be configured as a single transducer or multiple transducers, a transducer array or a movable transducer. To this end, FIG. 7 is a diagrammatical, cross-sectional illustration of the apparatus 210 and FIG. 8 is a diagrammatical perspective view illustration of the apparatus 210, in accordance with the second exemplary embodiment of the present disclosure. In FIGS. 7-8, the first and second transducers 220, 222 are configured as movable transducers, e.g., where the transducers 220, 222 can rotate, move in a linear direction, move in a non-linear direction, have an adjustable angle, or be movable in another manner. In FIG. 7, the first transducer 220 is movable and/or rotatable, which allows for control of the signal transmission, both in location and angle. The second transducer 222 is a movable sensor which is mounted on a platform 224 thereby allowing it to move along a linear direction on the container 240. In FIG. 8, the second transducer 222 is mounted to a platform 224 which allows it to be moved in a plane tangential to the container 240, e.g. when the container 240 has a cylindrical shape, such as that of a cylindrical tank or pipeline, the second transducer 222 can be moved on either side of a center line 211 of the container 240.

The movement ability of the second transducer 222 may be used to catch signals that reflect geometrically outside of a static second transducer 222 location, especially in the case of changing temperature or fluid composition of the material inside the container 240, and/or the need to send the signal in different directions. For instance, in FIG. 8, the second transducer 222 can move lateral to intercept a signal transmitted from the first transducer 220 which deviates from a linear path along the containers 240 length.

Further, the acoustic transducers 220, 222 may have the capability to rotate relative to the surface 244B of the container 240. In this way, it is possible to use multiple types of waves and to penetrate different distances inside the container 240 and/or change the path of the signal 250. Some types of containers 240 may require only planar movement on one side of the container 240, such as cuboid-shaped containers 240.

The number of the acoustic transducers 222 on the signal receiving side can be determined from the condition of the fluid inside the container 240 and the capabilities of each individual transducer 220, 222 to be moved. In one example, the one or more acoustic transducers 222 boosting the signal 250 from the initial transducer 220 may be situated in one linear path on the outside surface 244B of the container 240. In other examples, the acoustic transducers 220 may be positioned on an arched pathway, a spiral path around the axis of the container 240, especially in the case of use on a pipeline, or in another configuration.

Figure 9:
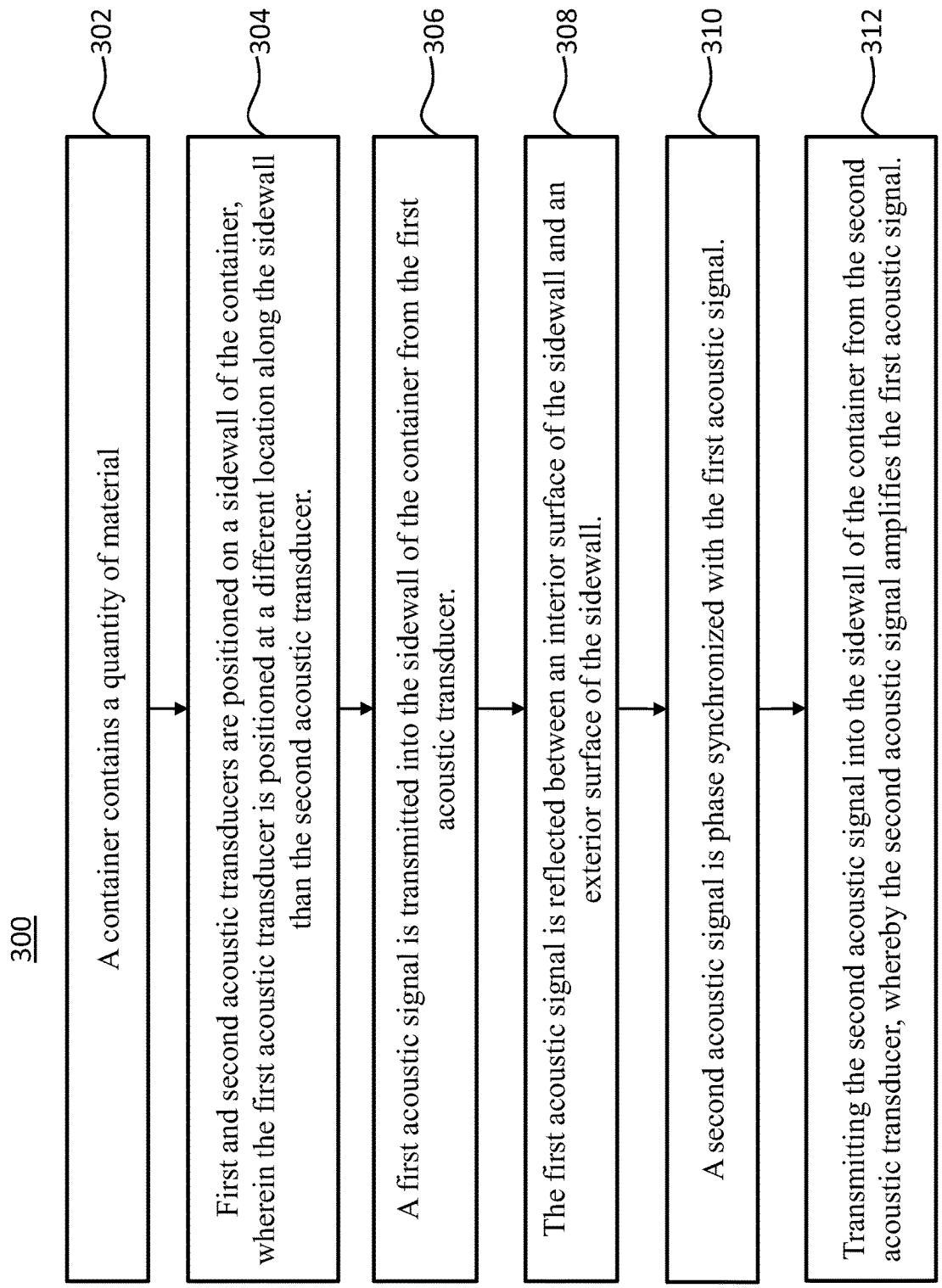
FIG. 9 is a flowchart illustrating a method of in-wall multi-bounce acoustic signal amplification, in accordance with the second exemplary embodiment of the disclosure.

FIG. 9 is a flowchart 300 illustrating a method of in-wall multi-bounce acoustic signal amplification, in accordance with the second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, a container contains a quantity of material. First and second acoustic transducers are positioned on a sidewall of the container, wherein the first acoustic transducer is positioned at a different location along the sidewall than the second acoustic transducer (block 304). A first acoustic signal is transmitted into the sidewall of the container from the first acoustic transducer (block 306). The first acoustic signal is reflected between an interior surface of the sidewall and an exterior surface of the sidewall (block 308). A second acoustic signal is phase synchronized with the first acoustic signal (block 310). Transmitting the second acoustic signal into the sidewall of the container from the second acoustic transducer, whereby the second acoustic signal amplifies the first acoustic signal (block 312). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus for multi-bounce material property detection, the apparatus comprising:
   a first acoustic transducer positioned on an exterior sidewall of a pipe carrying a quantity of fluid therein;
   an acoustic signal transmitted by the first acoustic transducer into the sidewall of the pipe from an exterior surface thereof, wherein at least a portion of the acoustic signal reflects off an interior surface of the sidewall of the pipe without entering an interior space of the pipe; and
   a second acoustic transducer positioned on the exterior sidewall of the pipe, wherein the reflected acoustic signal is received at the second acoustic transducer, and wherein the reflected acoustic signal provides an indication of a material property of the pipe or a material within the pipe.

2. The apparatus of claim 1, further comprising a computerized device in communication with the first and second acoustic transducers, wherein the material property of the pipe or the material within the pipe is determined with the computerized device based on the reflected acoustic signal.

3. The apparatus of claim 1, wherein the reflected acoustic signal provides the indication of the material property of the pipe or the material within the pipe based on a reflection coefficient at an interface between the exterior surface of the sidewall of the pipe and a quantity of air abutting the pipe.

4. The apparatus of claim 1, wherein the reflected acoustic signal provides the indication of the material property of the pipe or the material within the pipe based on a decreasing signal strength of the reflected acoustic signal.

5. The apparatus of claim 4, wherein the decreasing signal strength further comprises a first decrease of signal strength from each reflection of the acoustic signal off the interior surface of the sidewall of the pipe, and a second decrease of signal strength from each reflection of the acoustic signal off the exterior surface of the sidewall of the pipe, wherein the first decrease is different from the second decrease.

6. The apparatus of claim 4, wherein the reflected acoustic signal provides the indication of the material property of the pipe or the material within the pipe based on the decreasing signal strength of the reflected acoustic signal and a determination of a number of signal bounces within the sidewall of the pipe between the first and second acoustic transducers.

7. The apparatus of claim 6, wherein the determination of the number of signal bounces within the sidewall of the pipe between the first and second acoustic transducers further comprises a determination of an odd or an even number of signal bounces.

8. A method for multi-bounce material property detection, the method comprising:
   positioning a first acoustic transducer on an exterior sidewall of a pipe carrying a quantity of fluid therein;
   transmitting an acoustic signal with the first acoustic transducer into the sidewall of the pipe from an exterior surface thereof;
   reflecting at least a portion of the acoustic signal off an interior surface of the sidewall of the pipe without entering an interior space of the pipe;
   positioning a second acoustic transducer on the exterior sidewall of the pipe; and receiving the reflected acoustic signal at the second acoustic transducer, wherein reflected acoustic signal provides an indication of a material property of the pipe or a material within the pipe.

9. The method of claim 8, further comprising a computerized device in communication with the first and second acoustic transducers, and further comprising determining the material property of the pipe or the material within the pipe with the computerized device based on the reflected acoustic signal.

10. The method of claim 8, wherein the reflected acoustic signal provides the indication of the material property of the pipe or the material within the pipe based on a reflection coefficient at an interface between the exterior surface of the sidewall of the pipe and a quantity of air abutting the pipe.

11. The method of claim 8, wherein h reflected acoustic signal provides the indication of the material property of the pipe or the material within the pipe based on a decreasing signal strength of the reflected acoustic signal.

12. The method of claim 11, wherein the decreasing signal strength further comprises a first decrease of signal strength from each reflection of the acoustic signal off the interior surface of the sidewall of the pipe, and a second decrease of signal strength from each reflection of the acoustic signal off the exterior surface of the sidewall of the pipe, wherein the first decrease is different from the second decrease.

13. The method of claim 11, wherein the reflected acoustic signal provides the indication of the material property of the pipe or the material within the pipe based on the decreasing signal strength of the reflected acoustic signal and a determination of a number of signal bounces within the sidewall of the pipe between the first and second acoustic transducers.

14. The method of claim 13, wherein the determination of the number of signal bounces within the sidewall of the pipe between the first and second acoustic transducers further comprises determining an odd or an even number of signal bounces.

15. An apparatus for in-wall, multi-bounce acoustic signal amplification, the apparatus comprising:

a container containing a quantity of material;

first and second acoustic transducers positioned on a sidewall of the container, wherein the first acoustic transducer is positioned at a different location along the sidewall than the second acoustic transducer;

a first acoustic signal transmitted into the sidewall of the container from the first acoustic transducer, wherein the first acoustic signal reflects between an interior surface of the sidewall and an exterior surface of the sidewall without entering an interior space of the container; and a second acoustic signal transmitted into the sidewall of the container from the second acoustic transducer, wherein the second acoustic signal is phase synchronized with the first acoustic signal, and wherein the second acoustic signal amplifies the first acoustic signal.

16. The apparatus of claim 15, further comprising a synchronizing transducer sensor configured to phase synchronize the second acoustic signal with the first acoustic signal.

17. The apparatus of claim 15, wherein the first acoustic signal reflects between the interior surface of the sidewall and the exterior surface of the sidewall multiple times before arriving at the second acoustic transducer.

18. The apparatus of claim 15, wherein the first and second acoustic transducers further comprise more than two acoustic transducers, wherein each of the more than two acoustic transducers are positioned at each reflection point on the exterior surface of the sidewall, wherein the first acoustic signal is amplified by each of the more than two acoustic transducers.

19. The apparatus of claim 15, further comprising at least one platform, wherein at least one of the first and second acoustic transducers are mounted to the at least one platform, wherein the at least one of the first and second acoustic transducers has a movable position on the platform.

20. The apparatus of claim 15, wherein at least one of the first and second acoustic transducers is rotatable.

* * * * *